United States Patent
Son

(10) Patent No.: US 10,527,388 B2
(45) Date of Patent: Jan. 7, 2020

(54) SLING RETENTION DEVICE FOR A BALLISTIC VEST

(71) Applicant: Mike Son, Plainfield, IL (US)

(72) Inventor: Mike Son, Plainfield, IL (US)

( * ) Notice: Subject to any disclaimer, the term of this patent is extended or adjusted under 35 U.S.C. 154(b) by 0 days.

(21) Appl. No.: 15/695,794

(22) Filed: Sep. 5, 2017

(65) Prior Publication Data

US 2019/0072360 A1 Mar. 7, 2019

(51) Int. Cl.
*F41C 33/00* (2006.01)
*F16B 2/00* (2006.01)
*A44B 11/04* (2006.01)
*F16B 2/10* (2006.01)

(52) U.S. Cl.
CPC ............ *F41C 33/007* (2013.01); *A44B 11/04* (2013.01); *F16B 2/005* (2013.01); *F16B 2/10* (2013.01)

(58) Field of Classification Search
CPC .................................. A41F 15/02; A45F 3/12
USPC .................................... 224/264, 673; 24/511
See application file for complete search history.

(56) References Cited

U.S. PATENT DOCUMENTS

| | | | |
|---|---|---|---|
| 474,537 A * | 5/1892 | Steele .................. | A47G 25/485 24/511 |
| 2,423,531 A | 8/1945 | Theis | |
| 2,526,768 A | 6/1949 | Pendergrass | |
| 2,748,390 A | 2/1952 | Carlson | |
| 3,052,886 A | 9/1960 | White | |
| 3,083,885 A * | 4/1963 | Ware ...................... | F41C 33/00 224/182 |
| 3,153,791 A | 10/1964 | White | |
| 3,869,074 A | 3/1975 | Roach | |
| 3,940,039 A * | 2/1976 | Sasaki ....................... | A45F 5/02 224/264 |
| 4,040,147 A * | 8/1977 | King ........................ | A45F 5/02 224/264 |
| 4,386,723 A | 6/1983 | Mule | |
| 4,509,667 A | 4/1985 | Meldrum | |
| 4,542,840 A | 9/1985 | Pepper, Sr. et al. | |
| 4,731,923 A | 6/1988 | Marino | |
| D335,031 S | 4/1993 | Resnik et al. | |
| 5,244,430 A | 9/1993 | Legursky | |
| 5,388,742 A | 2/1995 | Ethridge et al. | |
| 5,564,610 A | 10/1996 | Barron | |
| 6,220,493 B1 * | 4/2001 | Iijima ....................... | A45F 3/00 224/153 |

(Continued)

*Primary Examiner* — Scott T McNurlen
(74) *Attorney, Agent, or Firm* — Greensfelder, Hemker & Gale, P.C.

(57) ABSTRACT

Disclosed and claimed here is a sling retention device for an object such as a gun worn over a body vest or ballistic vest. The device allows for the user to wear a sling across their body, while preventing the sling from making contact with the user's neck. The device consists of a base, an articulating hook, a spring and an attachment strap. The base is a rigid rectangle that lies flat on the user's shoulder and is attached to the vest by a strap that secures the device. The articulating hook is positioned with the open end facing away from the user's neck, and captures the sling between the hook and the base. When the sling is placed in the device, the device prevents the sling from making contact with the user's neck or head thereby reducing the discomfort to the user. The spring is designed to permit release of the articulating hook and allow rapid removal of the sling from the user's shoulder.

20 Claims, 5 Drawing Sheets

(56) References Cited

U.S. PATENT DOCUMENTS

| | | | |
|---|---|---|---|
| 7,841,496 B1 | 11/2010 | Schweikert | |
| 9,198,497 B2* | 12/2015 | Elam | A45F 3/00 |
| D770,883 S | 11/2016 | Mayhue et al. | |
| D788,254 S * | 5/2017 | Baehler | D11/200 |
| 2009/0117956 A1* | 5/2009 | Latz | A45C 11/00 |
| | | | 455/575.6 |
| 2012/0193378 A1* | 8/2012 | Schroedel, Jr. | F41C 23/02 |
| | | | 224/150 |
| 2014/0325803 A1* | 11/2014 | Iannello | F16M 11/041 |
| | | | 24/460 |

* cited by examiner

SLING RETENTION DEVICE FOR A BALLISTIC VEST

BACKGROUND OF THE INVENTION

It is commonly experienced that objects mounted on a sling are carried by placing the sling over the user's shoulder and locating the object obliquely on the user's opposite side. A typical example is the rifle used by military and law enforcement personnel. It is also common experience that carrying devices with such a sling for extended periods of time results in neck and head discomfort because the sling moves upward on the shoulder and into the neck. The invention maintains the sling in a fixed position on the shoulder and eliminates the movement of the sling to the neck and head.

It is also commonly experienced that slings employed by military and law enforcement carry rifles. It is necessary that nothing encumbers the rapid removal of the rifle sling and the deployment of the weapon. Certain commercial devices are available that capture the sling in place but they do not permit rapid, reliable removal of the sling and deployment of the weapon. Some devices have rigid plastic hooks which entangle the sling and furthermore are subject to mechanical failure in extreme environments.

This new sling device design allows the device to maintain a low profile when not in the open position, but can quickly open upward when the sling is pulled upwardly on the articulating hook, allowing quick removal of the sling from the device. A metal spring provides mechanical durability in the extreme environments frequently encountered by military and law enforcement users.

OBJECTS OF THE INVENTION

The object of this invention is to keep the sling and the weight of the object such as a weapon off the user's neck. Without this device, a sling worn across a shoulder and obliquely across the body, the weight of the object attached to the sling will pull the sling against the side of the user's neck. This constant abrasion by the sling rubbing the side of the neck creates discomfort over time. Even without the abrasion, the neck then carries the weight of the slung object also creating discomfort.

Another object of this invention is to provide a sling restraint device which permits the user to remove the sling from the shoulder by a sharp pull on the sling upward and over the top of the head. That upward pull will cause the device articulating hook to open upward on an angle, allowing the sling to break free of the device without having to touch the device itself.

Still another object of this invention is to provide a sling restraint for the user to position the sling over their head, (like a camera strap) while preventing the sling from touching the back of the user's neck. This is accomplished by attaching the device to the upper back of the user and thereby taking the weight off the sling off the back of the neck. This configuration only minimally compromises the rapid release of the sling by the restraint device.

DETAILED DESCRIPTIONS OF THE INVENTION

All illustrations of the drawings are for describing selected versions of the present invention and are not intended to limit the scope of the present invention.

Figure 1:
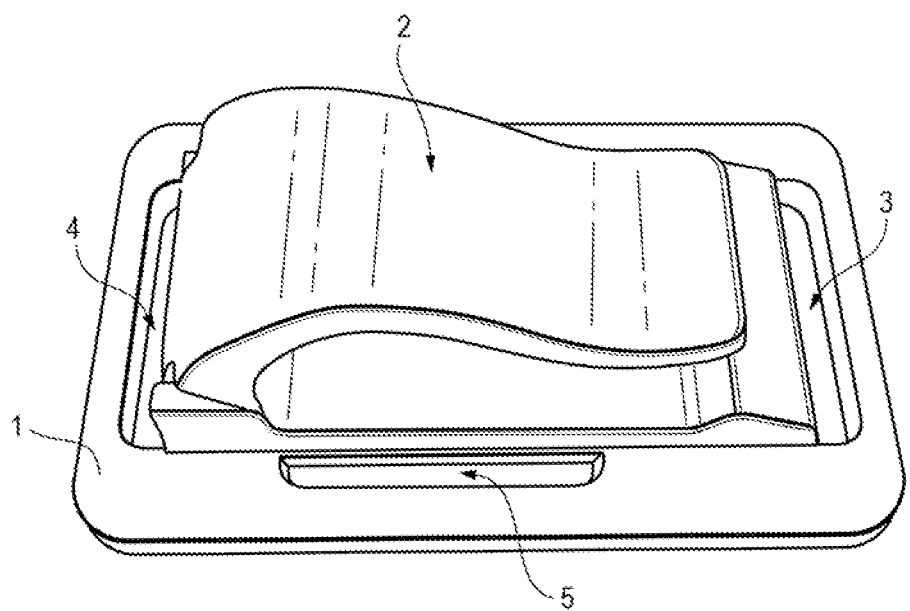
FIG. 1 is an isometric view of the present invention, without the retention strap connected.
Figure 2:
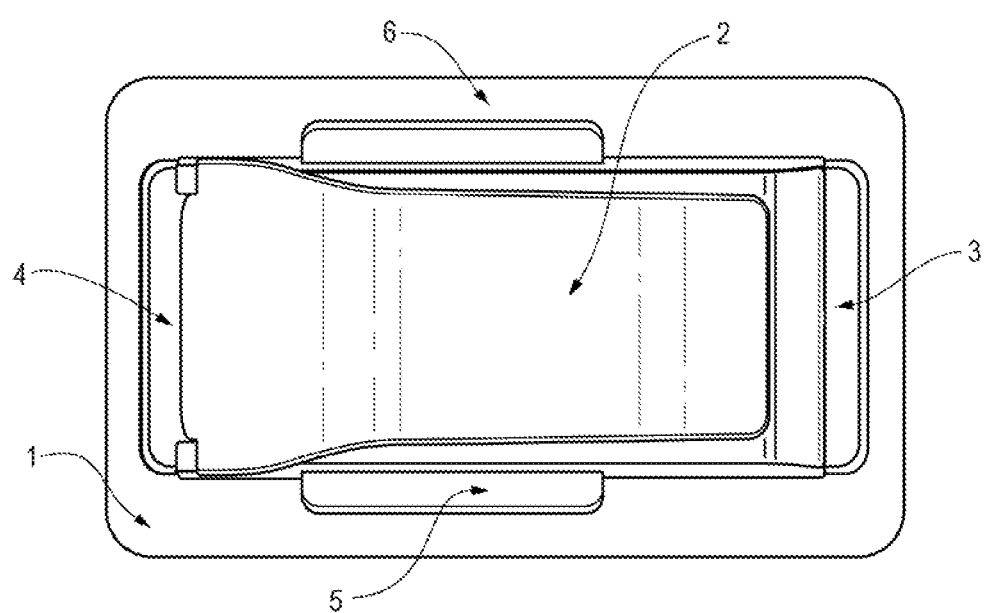
FIG. 2 is a top plan view of the present invention.
Figure 3:
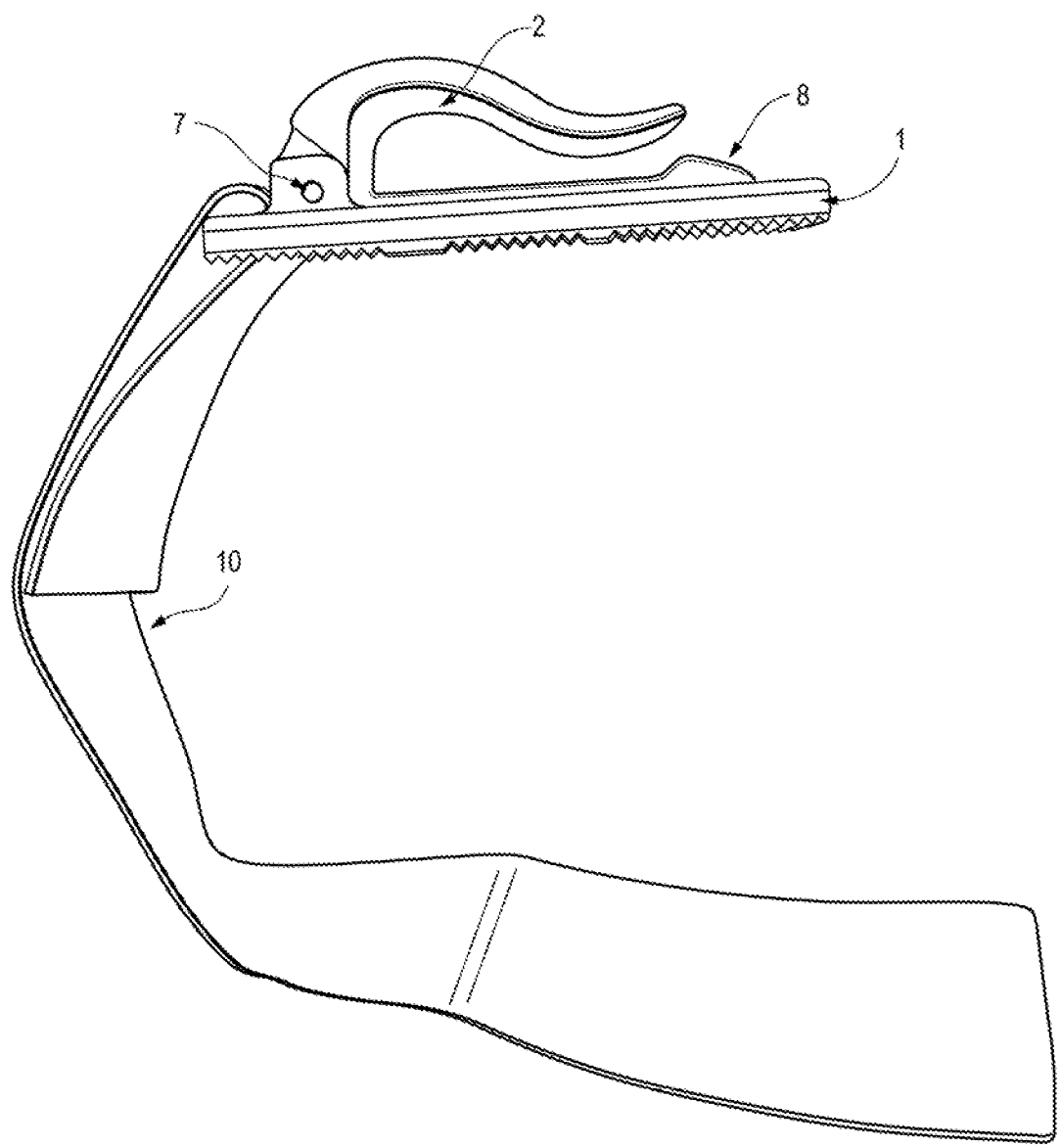
FIG. 3 is a side view of the present invention with the retention strap connected to the second slot.

As seen in FIGS. 1 and 3 the present invention is a sling retention device that can be worn on a ballistic or other similarly styled vest. Unlike previous devices that were intended to keep the sling from sliding off the user's shoulder, this invention is intended to keep the weight of the sling off the user's neck. The present invention could also be used to contain any device incorporating a cable or strap which extends obliquely across the user's body, thus preventing said cable or strap from rubbing or pulling on the user's neck. The present invention can be worn on either shoulder, or to the rear of the person's neck, on their back.

The base 1 is a flat panel that rests on top of the shoulder portion of the vest, or on the vest in the center of the back, just under the neck. The length of the base 1 is about the same width as the shoulder section of a ballistic or soft style vest, which properly situates the device on the top of the shoulder portion of the vest. The base 1 is rigid, and has a textured bottom side, unlike the attachment strap, to prevent the device from rotating under the vest shoulder portion. The base 1 is comprised of two pairs of opposing slots, slots 3, 4 and 5, 6 allowing the device to be secured across the width of the base or the length of the base. All slots 3, 4, and 5, 6 allow the attachment strap 10 to weave in and out of a slot 3, 4 or 5, 6, and under the device to the opposing slot, thus allowing the strap to attach to two points on the base.

The articulating sling hook 2 is located on the top the base 1 allowing the sling to lie under the hook 2, and above the base 1. The articulation of the hook on a metal pin 7 not only allows for varying sling thicknesses, but also a rapid removal of a sling from under the hook 2. When the tension on the sling increases, and a sling is placed under the sling hook 2 of the device, the sling hook 2 rises upward until it reaches approximately 45 degrees from the base 1. This sling hook will remain upward until the tension of the device is less than the tension created by the spring which is pulling downward on the hook. This articulation of the sling hook 2 allows the user to pull the sling up and over their head, freeing the sling from the device without having to manually adjust the device.

Figure 4:
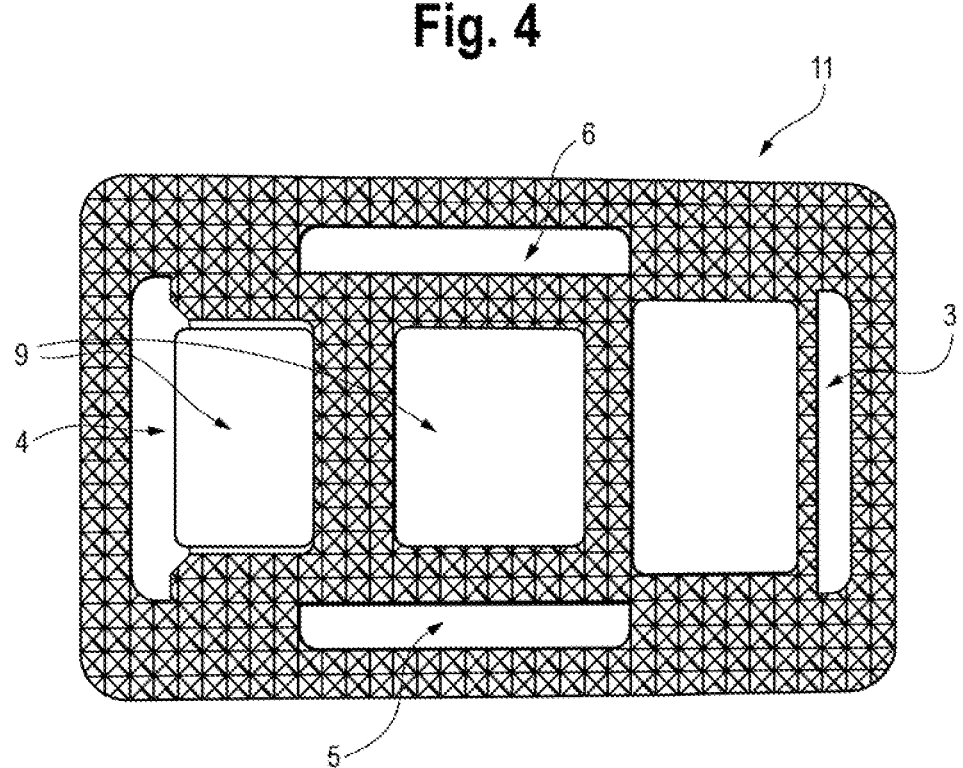
FIG. 4 is bottom plan view with the retention strap connected to the second slot.

When the sling hook is not under tension greater than the tension created by the device itself, the sling hook remains in a downward or flat position. This tension is created by the spring 9 seen in FIGS. 4 and 5. This allows the device to maintain a smaller profile than if the device contained a fixed sling hook in the upward position.

The spring 9 is located on the bottom of the base 1 and is in contact with the pivoting edge of the sling hook 2. As the sling hook 2 is forced upward away from the base 1, tension is increased by the spring 9, which is always in contact with the sling hook 2. The bottom end of the sling hook 2 between the pin holes of the base is shaped to increase tension on the spring 2 the further it rotates upward.

The sling hook 2 is curved and raised at the opposite end of the hinge point. This curve allows the sling hook to be in a downward position, but still creates an opening between the end of the sling hook 2 and the base 1. The opening allows a sling to be inserted into the space, and remain under the sling hook 2, but above the base. The raised edge 8 as seen in FIG. 3 on the base 1 sling aids in preventing the sling from sliding out from under the articulating hook through the open end. When a sling is inserted into the device, the device allows the transfer of weight from the sling to the device itself. The device prevents the sling from coming in contact with the user's neck and frees the neck from bearing the weight of the object carried by the sling.

Figure 5:
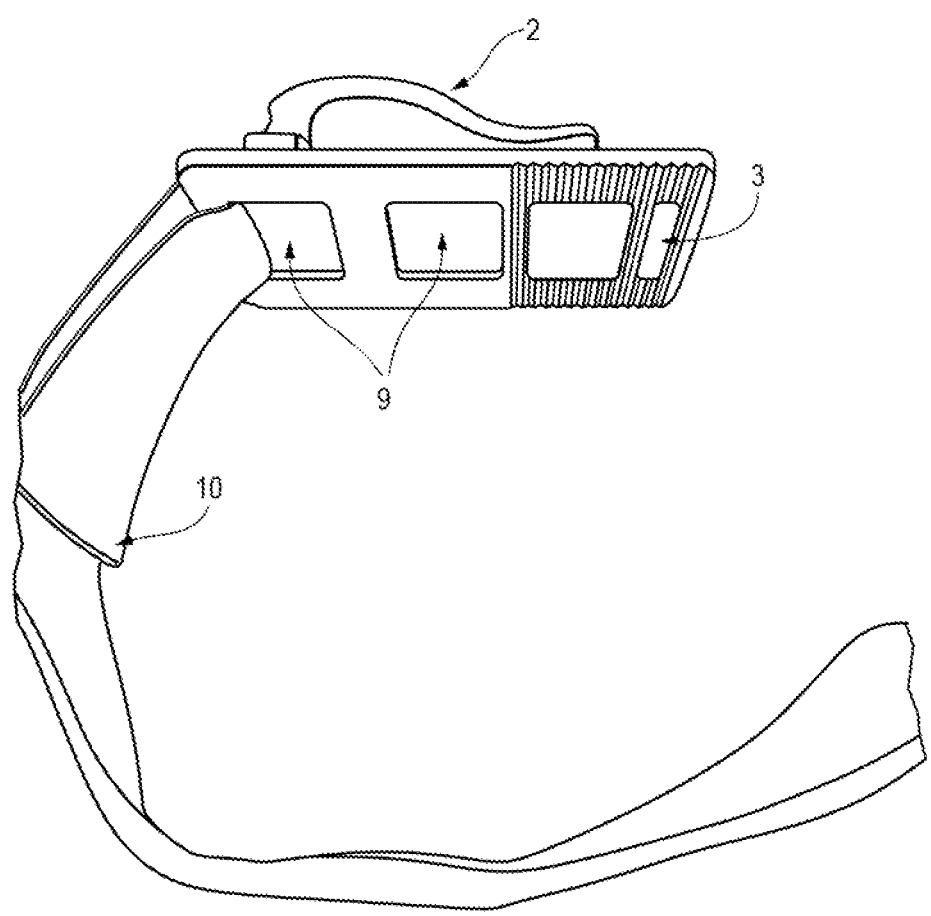
FIG. 5 is a bottom perspective view of the device and an attached retention strap.

The attachment strap 10 seen in FIGS. 3 and 5 wraps around the shoulder portion of the body worn vest. The attachment strap 10 creates downward tension on the base, keeping the base situated on top of the user's shoulder. The attachment strap 10 could also be attached to a drag style strap or Molle (Modular Lightweight Load-Carrying Equipment) system on the back of the user just below the neck, allowing the device to restrain the sling from moving to the rear of the user's neck, thus keeping the sling off the back of the user's neck.

The attachment strap 10 has two different sides and two different ends. Side 1 is comprised mainly of the loop portion of the hook and loop style material, with one end being the pull tab. The pull tab contains the hook portion of the hook and loop locking system. The other end of the retention strap contains the connecting tab. FIG. 3 shows the connection tab inserted into base 1 through slot 4.

Side 2 of the attachment strap 10 is substantially smooth except for the connection tab at the end of strap opposite the pull tab. The connection tab is comprised of a hook segment and an adjacent loop segment. The loop segment is at the end of the strap, and is woven into one of the slots on the base. The same end then folds back onto itself, and locks onto the segment containing the hook portion of the locking system. This creates a fixed connection between one end of the attachment strap 10 and the base 1.

When the connection tab is connected to slot 3 or 5, the pull tab end of the attachment strap then weaves under the vest or strap used to mount the device to the user, and into one of the opposing slots 4 or 6 in the base 1. The pull tab is then inserted into the opposing slot 4 or 6 and folded back onto itself on side 1, creating a fixed attachment to the other side of the base 1. The further the pull tab is pulled out of the opposing slot and back onto side 1, the more tension the strap creates downward on the base. This tension along with the textured surface 11 on the bottom of the base, prevents the device from sliding out of its original position.

The bottom of the base 11 is textured with raised points. These points increase friction between the bottom of the base 1 and the user's vest. The base 1 is a flat rectangle that rests on top of the shoulder portion of the user's vest or clothing. The length of the base 1 is the approximate width of the shoulder portion on the user's vest, and is slightly wider than the average rifle sling. The base 1 is rigid and the retention strap 10 is flexible which prevents the device from rotating to the underside of the shoulder area on the user's vest or clothing.

I claim:

1. A retention device for use with a ballistic vest having a shoulder portion spaced from a neck hole, the device comprising:
    a flat panel for mounting to the shoulder portion of the ballistic vest having a polygonal shaped peripheral wall, a first surface, a second surface opposed to the first surface, a first slot through the panel along a first portion of the peripheral wall, a second slot through the panel along a second portion of the peripheral wall opposed to the first portion of the peripheral wall;
    a hook shaped body is pivotally mounted to the flat panel to define a C-shaped channel with a first end of the channel having an upstanding wall to prevent inward movement of an article positioned in the channel along a first line toward the neck hole, and an opening into the channel at an opposed second end of the hook shaped body, the channel being dimensioned to receive the article for reciprocating sliding motion through the channel in a second direction transverse to the first direction;
    a spring connecting the flat panel to the hook shaped body to bias a distal end of the hook shaped body toward the first surface of the flat panel; and,
    a retaining strap for connecting the flat panel to the vest having a first end connected to the first slot of the flat panel and an opposed second end for connecting to the second slot of the flat panel.

2. The retention device of claim 1 further comprising a third slot through a third portion of the panel and a fourth slot through a fourth portion of the panel opposed to the third portion of the panel, the third portion being positioned between the first portion of the peripheral wall and the second portion of the peripheral wall.

3. The retention device of claim 1 wherein the hook shaped body pivots from an angle of 0° to 45° with respect to the first surface of the flat panel.

4. The retention device of claim 1 wherein a portion of the second surface of the flat panel is textured.

5. The retention device of claim 4 wherein the textured surface comprises raised points.

6. The retention device of claim 1 wherein the flat panel is rigid.

7. The retention device of claim 1 further comprising a pin for pivotally connecting the hook shaped member to the flat panel.

8. The retention device of claim 1 further comprising a pair of spaced tines extending away from the first surface and each tine having a through hole coaxially disposed with respect to one another, a proximal end of the hook shaped body has a through hole, the proximal end of the hook shaped body is positioned between the tines with the through hole of the pair of tines and the through hole of the proximal end of the hook shaped body are coaxially disposed, and the pin is positioned in the through holes to mount the hook shaped member to the flat panel for pivotal movement about the pin.

9. The retention device of claim 1 further comprising a groove in the flat panel retaining the spring to the flat panel.

10. The retention device of claim 9 wherein the groove comprises a pair of window openings through the flat panel and a bridge separating the pair of windows.

11. The retention device of claim 1 wherein the spring is flat and metal.

12. The retention device of claim 1 further comprising a raised edge extending from the first surface and positioned proximate the opening into the channel of the hook shaped body and spaced from the upstanding wall by a distance to accommodate the article.

13. The retention device of claim 12 wherein the raised edge has a beveled leading edge.

14. A ballistic vest comprising:
    a vest dimensioned for wear by a human, the vest having a shoulder portion and a back portion cooperating to define a neck receiving portion;
    a retention device secured to the vest on the shoulder portion or the back portion to resist the movement of an article toward the neck receiving portion, the retention device having a flat panel having a polygonal shaped peripheral wall, a first surface, a second surface opposed to the first surface, a first slot through the panel along a first portion of the peripheral wall, a second slot through the panel along a second portion of the peripheral wall opposed to the first portion of the peripheral wall;

a hook shaped body is pivotally mounted to the flat panel to define a C-shaped channel with a first end of the channel having an upstanding wall to prevent inward movement of an article along a first line toward the neck portion, and an opening into the channel at an opposed second end of the hook shaped body, the channel being dimensioned to receive the article for reciprocating sliding motion through the channel in a second direction transverse to the first direction;

a spring connecting the flat panel to the hook shaped body to bias the second end of the hook shaped body toward the first surface of the flat panel; and, a retaining strap connecting the flat panel to the vest.

15. The ballistic vest of claim 14 further comprising a third slot through a third portion of the panel and a fourth slot through a fourth portion of the panel opposed to the third portion of the panel, the third portion being positioned between the first portion of the peripheral wall and the second portion of the peripheral wall.

16. The ballistic vest of claim 14 wherein the hook shaped body pivots from an angle of 0° to 45° with respect to the first surface of the flat panel.

17. The ballistic vest of claim 14 wherein a portion of the second surface of the flat panel is textured.

18. The ballistic vest of claim 14 wherein the flat panel is rigid.

19. The ballistic vest of claim 14 further comprising a groove in the flat panel retaining the spring to the flat panel.

20. The ballistic vest of claim 14 further comprising a raised edge extending from the first surface and positioned proximate the opening into the channel of the hook shaped body and spaced from the upstanding wall by a distance to accommodate an article.

* * * * *